United States Patent [19]

Zelli

[11] 4,003,584
[45] Jan. 18, 1977

[54] DOLLY WITH ARTICULATED AND STEERABLE WHEELS

[76] Inventor: Sante Zelli, Via della Pace 24, Rome, Italy

[22] Filed: Aug. 14, 1975

[21] Appl. No.: 604,628

Related U.S. Application Data

[63] Continuation-in-part of Ser. No. 502,764, Sept. 3, 1974, Pat. No. 3,915,429.

[52] U.S. Cl. .............................. 280/91; 280/47.11
[51] Int. Cl.² ................................................ B62D 7/06
[58] Field of Search ......... 280/47.11, 91, 93, 87 R; 180/45

[56] References Cited

UNITED STATES PATENTS

| 2,715,534 | 8/1955 | Hoge et al. ..................... 280/47.11 |
| 2,756,066 | 7/1956 | Ludowici ............................. 280/91 |
| 2,915,319 | 12/1959 | Kumler et al. ...................... 280/91 |
| 2,995,380 | 8/1961 | King ..................................... 280/91 |
| 3,018,116 | 1/1962 | Summers et al. .................... 280/91 |
| 3,090,516 | 5/1963 | Seymour et al. ................ 280/47.11 |
| 3,297,337 | 1/1967 | Sargent ................................ 280/91 |
| 3,306,390 | 2/1967 | Jamme ............................ 180/26 R |
| 3,572,458 | 3/1971 | Tax ..................................... 280/91 |
| 3,917,305 | 11/1975 | Di Chirico ........................... 280/93 |

Primary Examiner—M. H. Wood, Jr.
Assistant Examiner—Jack D. Rubenstein

[57] ABSTRACT

Dolly with articulated and steerable wheels, having steering angle compensation on the driving wheels, for particular use with cinema and television cameras.

13 Claims, 14 Drawing Figures

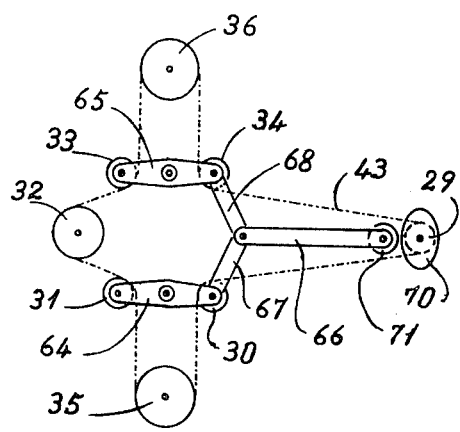
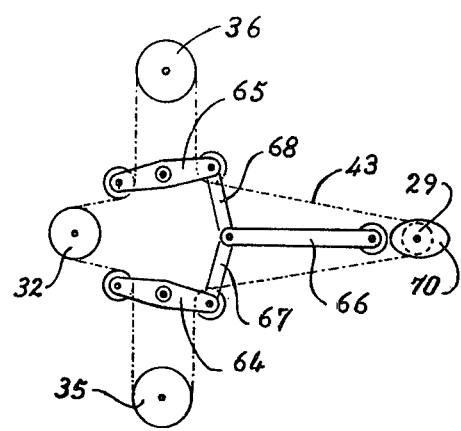
Fig. 9    Fig. 10
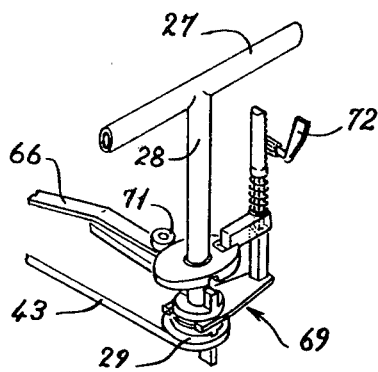
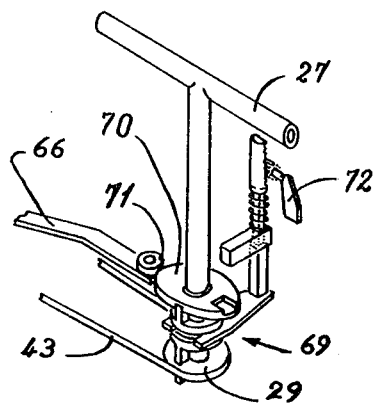
Fig. 6    Fig. 7
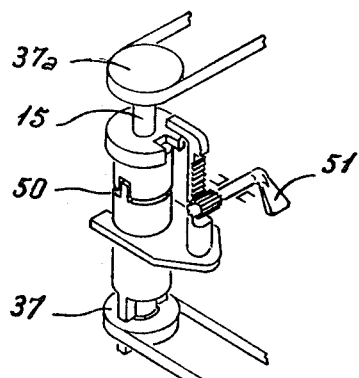
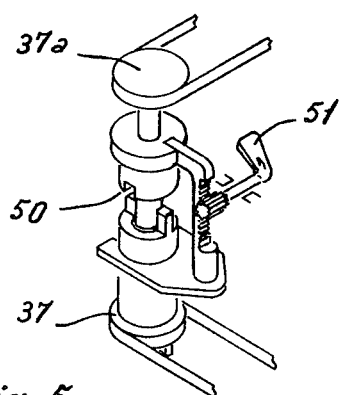
Fig. 4    Fig. 5

DOLLY WITH ARTICULATED AND STEERABLE WHEELS

This is a continuation-in-part application of application Ser. No. 502,764, filed Sept. 3, 1974, now U.S. Pat. No. 3,915,429.

This invention concerns in general wheeled trolleys for use in various fields for the transport of materials or service apparatus, and in particular a wheeled trolley of the type used in the cinema and television industry to carry a cinema or television camera together with the cameraman for the purpose of taking pictures while in motion.

Considered in detail, the invention concerns a trolley with articulated and steerable wheels, having steering angle compensation on the driving wheels, or, in other words, in which the perpendiculars to the planes of the driving wheels which pass through their centres converge, whatever the steering angle, on points which lie along the axis of the wheels opposite the driving wheels. These points are instantaneous centres of rotation for the trolley.

Considered in detail from another angle, the invention concerns a trolley with articulated and steerable wheels for cinema and television cameras especially useful where the trolley has to move in restricted spaces or along complicated trajectories which may be curved, straight, interrupted or a combination of these.

Although we consider that the invention is seen to best advantage in the cine-television field in circumstances such as these, it is not however intended by this to limit its application to this specific purpose, since, as experts will understand, the invention may find applications in industry, in factories, in study and research centres, etc.

We know that movie cameras are mounted on trolleys in order, among other things, to film scenes while in motion. It seems therefore evident that the trolley must be able to move in particular ways in order to adapt itself to the particular requirements of filming. Let us take as an example the sideways tracking movement, in which all the wheels are parallel to one another but inclined to the longitudinal axis of the trolley at any angle up to a right angle; or curved movement, as in a normal car with two fixed wheels and two steerable driving wheels; or zig-zag movement, which may be considered as a combination of sideways tracking while the orientation of the trolley itself remains unchanged.

In movement in a curve, that is as in a normal car with two fixed wheels and two steerable driving wheels, it should be pointed out that normal steering systems result in both the driving wheels being at the same angle. The following simple considerations will allow the essence of the problem to be understood. When the four wheels of the trolley are parallel to each other, the forward movement of the trolley may be considered a rotary movement about a centre to infinity defined by the common direction of the perpendiculars to the planes of the wheels. When the driving wheels are turned to steer the trolley, the instantaneous centre of rotation of the trolley should lie on the axis of the two fixed wheels. To achieve this the perpendiculars to the planes of the two driving wheels passing through their centres must converge to a point on the line of this axis. Naturally this is not the case if the two driving wheels are turned at the same angle. Therefore the angling of the two driving wheels must be differentiated. Such differentiation is unnecessary in crude machinery, but is extremely important in precision mechanisms where sliding is to be avoided and accuracy maintained.

Finally, it should be pointed out that it is often necessary to modify the actual layout of the wheels, varying the pitch or the gauge to meet particular requirements, for example if filming in a railway tunnel, or between restaurant tables, where exigencies of space pose particular problems.

Bearing the above in mind, one purpose of this invention is to produce a four-wheeled trolley whose wheels can be turned at the same time in the same degree so as to remain parallel with each other and thus enable sideways tracking movements to be carried out.

Another purpose of this invention is to produce a trolley in which two of its four wheels remain non-steerable, the other two being steerable.

Yet another purpose of this invention is to produce a trolley with four wheels mounted at the ends of four articulated arms, so as to be able to vary the pitch and gauge of the wheels, meaning by "pitch" the distance between the pair of front wheels and the pair of back wheels, and by "gauge" the distance between the wheels on one side and those on the other side.

By various combinations of the structural characteristics described, all these movements can be achieved, along with other, more specialised movements, such as rotation of the trolley about itself, cyclical evolutions.

In one recommended form, the invention comprises a chassis shaped like a squared-off U; a rear projection integral with the chassis carrying a steering handle mounted on a vertical shaft; a first, second, third and fourth arm, articulated to the four extremities of the said chassis by means of a first, second, third and fourth vertical joint pin and each carrying a wheel set; a sprocket integral with the vertical shaft of the said handle; various sprockets mounted on the chassis; a first, second and third sprocket integral with each other and mounted on the said first joint pin; a first, second, and third sprocket integral with each other and carried on the said third joint pin; a first and second sprocket carried by the said second joint pin; a first and second sprocket carried by the said fourth joint pin; a first coupling and a second coupling positioned between the first and second sprocket of the second and of the fourth joint pins; a mechanism comprising a perforated positioning disc, a locking pin, a spring and a release pedal in association with each of the said articulated arms serving to orientate and lock the said articulated arms at various angles; various endless chains connecting the said sprockets in order to transmit rotary movement from the said handle to the said wheels.

In one recommended form, the invention comprises a chassis shaped like a squared-off U; a rear projection integral with the chassis carrying a steering handle mounted on a vertical shaft; a first, second, third and fourth arm, articulated to the four corners of the said chassis by means of a first, second, third and fourth vertical joint pin and each carrying a wheel set; two of these wheel sets being driving wheels; a first sprocket integral with the vertical steering column; a second sprocket mounted on the chassis; a third sprocket mounted on the said first joint pin; a fourth sprocket mounted on the said third joint pin; two compensation arms pivoted centrally on the said chassis each carrying at their extremities two gear sprockets; a cam free mounted on the said vertical shaft of the handle; a joint capable of being disconnected between the said cam and the said first sprocket; a roller tappet which follows the profile of the said cam and activates a slider, the extremity of which opposite the roller tappet is connected to the ends of the said compensating arms by means of two levers; an endless chain passing round the said first, second, third and fourth sprockets and around the said gear sprockets carried by the said compensation arms.

Further purposes and characteristics of the invention will be evident from the following description, made with reference to the attached drawings, which show one recommended form for the invention to take, but are to be considered as purely illustrative and not limitative and in which:

FIG. 4 shows in detail the articulation of the arm of a front wheel with the coupling and uncoupling mechanism of the chain transmission, in the engaged position;

FIG. 5 shows the coupling and uncoupling mechanism of FIG. 4 in the disengaged position;

FIG. 6 shows in detail the articulation of the handle controlling the steering with the coupling and uncoupling mechanism of the chain transmission, in the position of non-activation of the steering compensation arrangement;

FIG. 7 shows in detail the articulation of the steering handle with the coupling and uncoupling mechanism of the chain transmission, in the position of activation of the steering compensation arrangement.

FIG. 9 is a diagrammatic plan of the arrangement for compensation of the steering angles of the trolley's driving wheels; and FIG. 10 is similar to FIG. 9, but shows the arrangement in a different functioning position;

Figure 1:
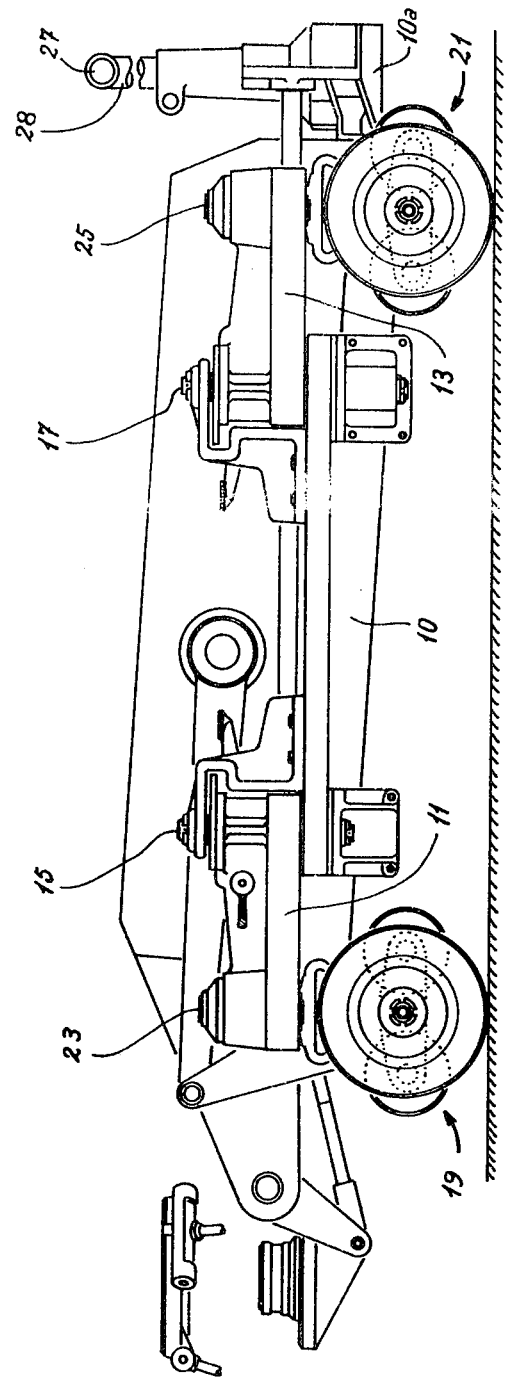
FIG. 1 is a lateral elevation of the trolley according to the invention.

Referring to the diagrams in detail, we now see that the trolley according to the invention comprises a chassis 10, which in its simplest form is shaped like a squared-off U, having at its four corners four arms 11, 12, 13 and 14, articulated on vertical pivots 15, 16, 17 and 18, the ends of which arms carry four wheel sets 19, 20, 21, 22 rotating on vertical pivots 23, 24, 25, 26.

Figure 12:
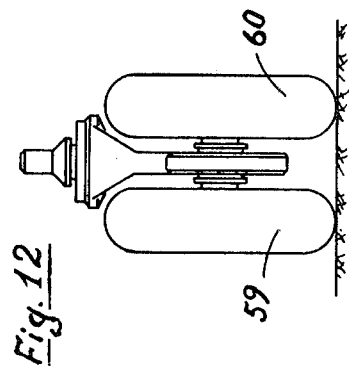
FIG. 12 is a frontal view of one of the trolley's wheel sets.
Figure 11:
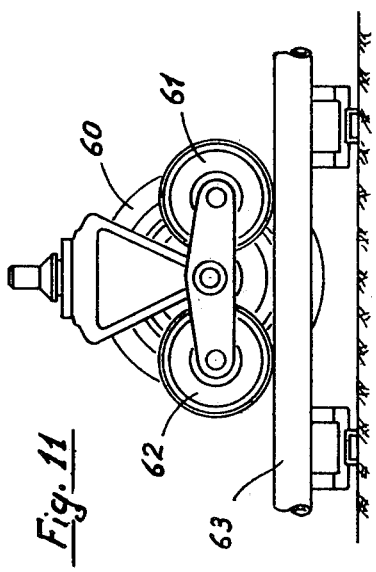
FIG. 11 is a cutaway view of one of the trolley's wheel sets, seen from the side.

The wheel sets 19, 20, 21 and 22 each comprise two rubber wheels and two metal wheels, for reasons which will appear later with reference to FIGS. 11 and 12, but functionally each group corresponds to a single wheel; therefore, for ease of description and understanding of the invention each group of wheels 19, 20, 21 and 22 will be considered and referred to as a single wheel 19, 20, 21 and 22.

The transverse arm of the chassis is connected to a steering handle 27 integral with a vertical rotating column 28. FIG. 1 shows in more detail that the handle 27 is carried on a rear projection 10a integral with the transverse arm (not shown) of the chassis 10.

The transmission of rotary movement from the handle 27 to the four wheels 19, 20, 21 and 22 is effected by means of various chains and sprockets as described below.

Figure 4A:
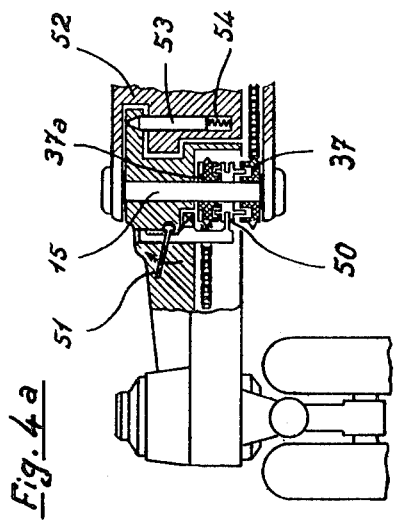

The vertical column 28 of the handle 27 carries beneath it a sprocket 29: the transverse arm of the chassis 10 carries various compensation sprockets 30, 31, 32, 33, 34, forming part of the compensation arrangement described below; the two joint pins 17 and 18 of the two rear articulated arms 13 and 14 each carry a first sprocket, 35 and 36 respectively, a second sprocket, 35a and 36a respectively, and a third sprocket, 35b and 36b respectively. The three sprockets 35, 35a and 35b and 36, 36a and 36b of each pivot are integral with one another. The two joint pins 15, 16 of the two front articulated arms 11, 12 each carry a first sprocket, 37 and 38 respectively, and a second sprocket, 37a and 38a respectively. The sprockets 37, 37a and 38, 38a of each pivot are not integral, but may be made so by means of a coupling mechanism, illustrated in FIGS. 4 and 5 and described below.

The pins 23, 24, 25 and 26 of the four wheels 19, 20, 21 and 22 each carry a sprocket, 39, 40, 41 and 42 respectively.

It will be easily understood that the sprockets 39, 40, 41 and 42 are integral with the pivots 23, 24, 25 and 26 respectively of the wheels 19, 20, 21, 22 respectively; indeed the said wheels must be orientated by a control which is transmitted by chains to these very sprockets; vice versa, the sprockets 35, 35a, 35b; 36, 36a, 36b; 37, 37a; 38, 38a are not integral with their respective pivots 17, 18, 15, 16, because the said pivots 17, 18, 15, 16 are the joint pins for the arms 13, 14, 11 and 12 respectively and the orientation of the said articulated arms must be independent of the orientation of the wheels.

A first endless chain 43 passes around the sprocket 29 of the handle 27, then around the first sprocket 30 of the compensation arrangement, then around the first sprocket 35 of the first joint pin 17, then around the second, third and fourth sprockets 31, 32 and 33 of the compensation arrangement, then around the first sprocket 36 of the third joint pin 18, and finally around the fifth sprocket 34 of the compensation system.

A second endless chain 44 passes around the second sprocket 35a of the joint pin 17 and around the first sprocket 37 of the second joint pin 15.

A third endless chain 45 passes around the second sprocket 36a of the third joint pin 18 and around the first sprocket 38 of the fourth joint pin 16.

A fourth endless chain 46 passes around the third sprocket 35 of the first joint pin 17 and around the sprocket 41 of the wheel 21.

A fifth endless chain 47 passes around the second sprocket 37a of the second joint pin 15 and around the sprocket 39 of the wheel 19.

A sixth endless chain 48 passes around the third sprocket 36b of the third joint pin 18 and around the sprocket 42 of the wheel 22.

A seventh endless chain 49 passes around the second sprocket 38 of the fourth joint pin 16 and around the sprocket 40 of the wheel 20.

Figure 5A:
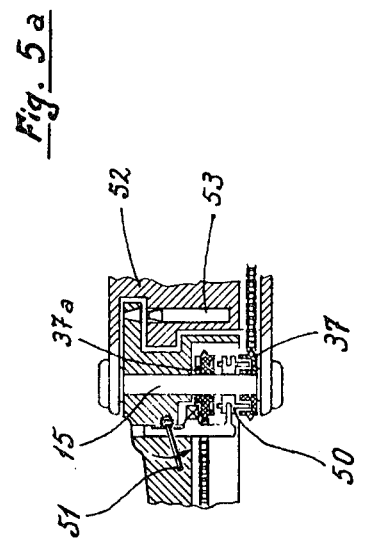
FIGS. 4a and 5a show views similar to those of FIGS. 4 and 5 of another method of achieving articulation of the arm of a front wheel with the coupling mechanism according to the invention.

As will be seen by referring to FIGS. 4 and 5 the two sprockets 37 and 37a carried by the joint pin 15, and similarly the two sprockets 38 and 38a carried on the joint pin 16, are not integral with one another but may be made so by means of a toothed coupling 50 controlled by a lever 51 having two positions. In the position shown in FIG. 4, the toothed coupling 50 is engaged and the two sprockets 37 and 37a rotate integrally, while in the position shown in FIG. 5, the coupling 50 is disengaged and the two sprockets 37 and 37a do not rotate integrally.

Although it is not explicitly described, it is intended that similar couplings may also be provided, without in this exceeding the scope of this invention, between the sprockets of the other joint pins 17 and 18, in order to meet particular requirements.

The operation is easily understood seeing that the rotation of the handle is transmitted by the chain 43 to the sprockets 35 and 36 which are integral with the sprockets 35a, 35b and 36a, 36b respectively. From the sprockets 35b and 36b the rotation is transmitted directly to the wheels 21 and 22 by means of the endless chains 46 and 48 and the sprockets 41 and 42 carried by the said wheels. From the sprockets 35a and 36a the rotation is transmitted, by means of the endless chains 44 and 45, to the sprockets 37 and 38, carried by the joint pins 15 and 16 respectively, and, if the levers 51 are in the upper position A, that is with the coupling 50 engaged, then the rotary movement is also transmitted from the sprockets 37a and 38a directly to the wheels 19 and 20 by means of the endless chains 47 and 49 and the sprockets 39 and 40 carried by the said wheels.

The combinations of movements which may be obtained by engaging and disengaging the couplings 50 should by now be evident, as should the combinations of movements to be obtained if similar couplings are also provided between the sprockets of the two joint pins 17 and 18.

In an alternative method of articulation of the arms of the front wheels with a coupling and uncoupling system included, there is also provided a locking device which is described below.

The four arms 11, 12, 13 and 14 carrying the wheels, and jointed onto the chassis 10 by means of four pins 15, 16, 17, 18, carry an integral disc 52 perforated with various "positioning" holes. The chassis 10 carries four locking pins, for example 53 in FIG. 4a, which connect with the holes provided in the said positioning discs 52. More particularly, the locking pins 53 are held by means of helical compression springs 54 against the perforated discs 52 so that, when a pin 53 meets a hole in the disc 52, it enters the said hole and locks the disc. Since each articulated arm 11, 12, 13, 14 carries a disc 52 with various holes arranged as an arc of a circle, the said arms may be regulated at angles to their joint pins 15, 16, 17, 18 and locked in various angular positions by means of the engagement of the locking pins 53 with the holes of the said positioning disc. To disengage the locking pins 53 from the said holes, the chassis 10 carries four pedals 55, 56, 57, 58 hinged to the chassis 10 and connected to the locking pins 53 so that when a pedal, for example 55, is pressed, the locking pin 53 is disengaged from the hole in the positioning disc 52, overcoming the force of the spring 54.

Figure 2:
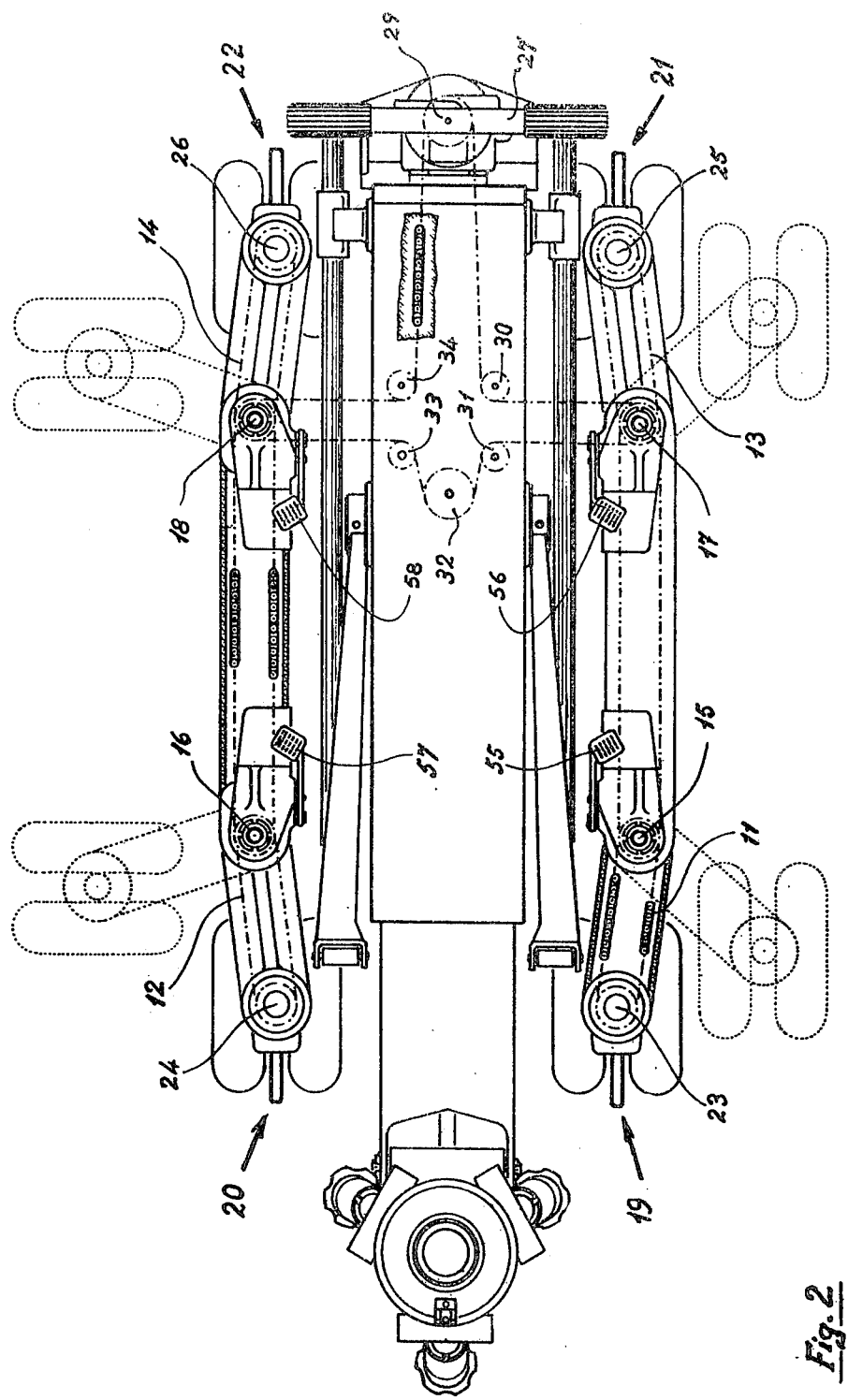
FIG. 2 is a plan, partly diagrammatic and with some sections cut away, of the trolley as in FIG. 1, with dotted lines showing possible positions of the articulated arms carrying the wheels.
Figures 3, 8:
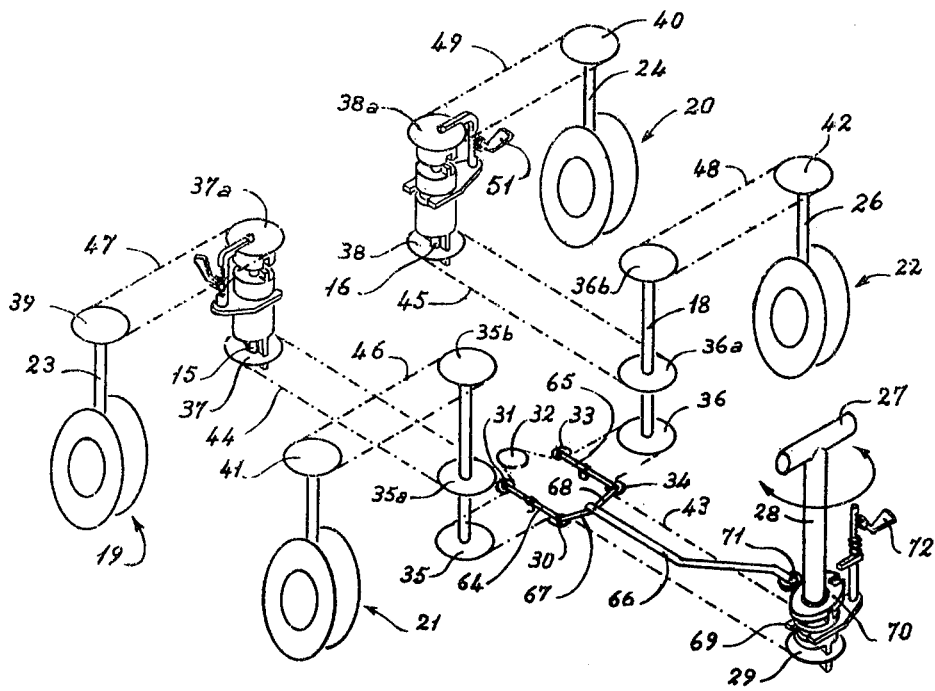
FIG. 3 is a diagram of the chain transmission for the orientation and steering of the wheels.
FIG. 8 is a perspective diagram similar to the diagram in FIG. 3.

It is stressed that the mechanism of perforated disc, locking pin, spring and pedal is identical for all four articulated arms 11, 12, 13, 14, and that the said articulated arms may be freely and independently orientated around their axes of articulation. In FIG. 2 the dotted lines show some possible positions of the articulated arms in which they may be locked by means of the locking pin engaging in the appropriate hole in the positioning disc.

To eliminate difficulties caused by having to transport and change over different types of wheel to allow the trolley to move both on flat surfaces and on tracks, the wheels of the trolley in this invention are composite. For this reason, although we have spoken simply of the "wheels" 19, 20, 21, 22, in fact each "wheel" is a set of wheels comprising two outer wheels with rubber (solid or pneumatic) tyres 59, 60, suitable for movement on flat surfaces, and two internal wheels 61, 62 suitable for movement on a track 63.

We will now describe the system for compensation of the steering angle, illustrated in FIGS. 6, 7, 8, 9 and 10. Although some of the parts have already been described they will be cited again in order to demonstrate their function within this compensation system.

The compensation system comprises four sprockets 29, 35, 32, 36 arranged in the form of a Latin cross on pins fixed to the trolley chassis. In particular, the sprocket 29 is pivoted on the end of the longest arm of the cross and is specifically integral with the column 28 of the handle 27 and is controlled by it. The sprockets 35 and 36 are pivoted at either end of the transverse arm of the cross, while the sprocket 32 is mounted at the end of the short arm of the cross; this sprocket 32 is free and serves simply to sustain the line of the chain 43. It has already been said, but is again stressed, that the chain 43 is only one possible way of achieving a flexible transmission, other possibilities being a smooth belt, a toothed belt or any other transmission device.

The chain 43 assumes the form of a Latin cross thanks to the presence of two compensation arms 64 and 65 pivoted centrally on two pins fixed to the chassis and lying on the axis of the driving wheels or, in other words, on the straight line joining the centres of the two sprockets 35 and 36. The compensation arms 64, 65 carry at either end two small sprockets, 30, 31 and 33, 34 respectively, and are pivoted at a distance such that the line of the chain 43 describes when at rest and under tension a perfectly parallel cross.

The vertical shaft or column 28 of the handle 27 also carries a cam 70, along the profile of which runs a tappet roller 71, which activates longitudinally a slider 66, the end of which opposite to the tappet roller 71 is connected by two levers 67 and 68 to the ends of the compensation arms 64 and 65. The slider 66 therefore transmits its longitudinal movement to the levers 67 and 68 which in their turn cause the compensation arms 64 and 65 to diverge to a greater or lesser extent depending on the rotation of the cam 70. This greater or lesser divergence of the compensation arms 64 and 65 affords variations in the lengths of the segments of chain extending between the four sprockets 29, 35, 32 and 36 and around the gear sprockets 30, 31, 33 and 34 provided at the ends of the compensation arms. Simple analytical calculations, easily carried out by experts in this field, will show that the variation in the lengths of the said segments of chain causes a differentiation between the steering angles of the two driving wheels 21, 22 such that the perpendiculars to the planes of the driving wheels 21, 22 which pass through their centres meet at a point on the axis of the other two wheels 19 and 20. In this way there is an instantaneous centre of rotation of the trolley, and one which is unique, for every steering angle of the driving wheels 21 and 22.

It should be noted that between the cam 70 and the sprocket 29 there is provided a toothed joint 69 operated by the lever 72 which has two positions, so that when it is engaged, as in FIG. 7, the sprocket 29 and the cam 70 are rendered integral in rotation; while when it is disengaged, as in FIG. 6, the cam 70 is disconnected from the sprocket 29. Obviously, in the disengaged position the rotary movement of the handle 27 is transmitted only to the sprocket 29 and from it to the successive transmissions without touching the compensation system described above.

We have here described the recommended form for the invention to take and some of its obvious variations; however numerous modifications and alterations of the construction details may be made by those competent to do so, without in so doing exceeding the scope of the invention or departing from its instructive principles.

What I claim is:

1. Trolley with articulated and steerable wheels, for particular use with cinema and television cameras, characterised by the fact that it comprises a chassis (10) shaped like a squared-off U; a rear projection integral with the chassis and carrying a control handle (27) mounted on a vertical shaft (28); a first (13), a second (11), a third (14), and a fourth arm (12), articulated to the four corners of the said chassis (10) by means of a first (17), a second (15), a third (18) and a fourth (16) vertical joint pin and each carrying a wheel set (21, 19, 22, 20); a sprocket (29) integral with the vertical shaft (28) of the said handle; idler sprocket means (30, 31, 32, 33, 34) mounted on the chassis; a first, a second and a third sprocket (35, 35a, 35b) integral with one another and carried on the said first joint pin (17); a first, a second and a third sprocket (36, 36a, 36b) integral with one another and carried on the said third joint pin (18); a first and a second sprocket (37, 37a) carried on the said second joint pin (15); a first and a second sprocket (38, 38a) carried on the said fourth joint pin (16); a first coupling (50) and a second coupling positioned between the first and second sprocket (respectively 37 and 37a, and 38 and 38a) of the second (15) and the fourth (16) joint pin; a mechanism comprising a perforated positioning disc (52), locking pin (53), spring (54) and release pedal (55, 56, 57, 58) in association with each of the said articulated arms (11, 12, 13, 14) in order to orientate and lock the said articulated arms in various angular positions; endless chain means connecting the said sprockets in order to transmit rotary movement from the said handle to the said wheels.

2. Trolley with articulated and steerable wheels according to claim 1, characterised by the fact that the said wheel sets (19, 20, 21, 22) each comprise two outer wheels (59, 60) with rubber (solid or pneumatic) tyres, suitable for movement on flat surfaces, and two internal wheels (61, 62) suitable for movement on tracks.

3. Trolley with articulated and steerable wheels according to claim 2, characterised by the fact that the said wheel sets (19, 20, 21, 22) are mounted on vertical pivots and each carry a sprocket which is integral in rotation (39, 40, 41, 42).

4. Trolley with articulated and steerable wheels according to claim 1, characterised by the fact that the said endless chain means for transmitting rotary movement from the said handle (27) to the said wheels comprise:

a. a first endless chain (43) passing round the sprocket (29) of the steering handle (27) then around a first sprocket (30) carried on the chassis, then around the first sprocket (35) of the first joint pin (17), then around the second, third and fourth sprockets (31, 32, 33) carried on the chassis, then around the first sprocket (36) of the third joint pin (18) and finally around the fifth sprocket (34) carried on the chassis.

b. a second endless chain (44) passing around the second sprocket (35a) of the first joint pin (17) and around the first sprocket (37) of the second joint pin (15);

c. a third endless chain (45) passing around the second sprocket (36a) of the third joint pin (18) and around the first sprocket (38) of the fourth joint pin (16);

d. a fourth endless chain (46) passing around the third sprocket (35) of the first joint pin (17) and around the sprocket (41) of the wheel (21) associated with it;

e. a fifth endless chain (47) passing around the second sprocket (37a) of the second joint pin (15) and around the sprocket (39) of the wheel (19) associated with it;

f. a sixth endless chain (48) passing around the third sprocket (36b) of the third joint pin (18) and around the sprocket (42) of the wheel (22) associated with it;

g. a seventh endless chain (49) passing around the second sprocket (38) of the fourth joint pin (16) and around the sprocket (40) of the wheel (20) associated with it.

5. Trolley with articulated and steerable wheels according to claim 1, characterised by the fact that the sprockets (35, 35a, 35b) carried by the first joint pin (17) are integral with one another but capable of rotation around the said joint pin (17).

6. Trolley with articulated and steerable wheels according to claim 1, characterised by the fact that the sprockets (36, 36a, 36b) carried by the third joint pin (18) are integral with one another but capable of rotation around the said joint pin (18).

7. Trolley with articulated and steerable wheels according to claim 1, characterised by the fact that the said couplings (50) positioned between the first and second sprockets (respectively 37, 37a and 38, 38a) of the second (15) and fourth (16) joint pins are toothed couplings which, in the engaged position, render the sprockets between which they are inserted integral with one another and, in the disengaged position, render the said sprockets free to rotate independently.

8. Trolley with articulated and steerable wheels according to claim 7, characterised by the fact that the said couplings (50) are each controlled by a lever (51) having two positions (A, B).

9. Trolley with articulated and steerable wheels according to claim 1, characterised by the fact that the mechanisms for orientating and locking the said articulated arms (11, 12, 13, 14) in various angular positions each comprise a perforated disc (52) fixed integrally on the said articulated arms; a locking pin (53) carried on the chassis (10) which runs vertically and is engaged by means of a compression spring (54) with a corresponding hole of the said perforated disc; a release pedal (for example 55) hinged on the chassis and operable to disengage the said locking pin (53) from the corresponding hole in the perforated disc (52) by overcoming the force of the said compression spring (54).

10. Trolley with articulated and steerable wheels, for particular use with cinema and television cameras, characterised by the fact that it comprises a chassis (10) shaped like a squared-off U; a rear projection integral with the chassis and carrying a control handle (27) mounted on a vertical shaft (28); a first (13), a second (11), a third (14) and a fourth arm (12), articulated to the four corners of the said chassis (10) by means of a first (17), a second (15), a third (18) and a fourth (16) vertical joint pin and each carrying a wheel set (21, 19, 22, 20) two of these wheel sets being driving wheels (21, 22); a first sprocket (29) integral with the vertical shaft (28) of the said handle (27); a second sprocket (32) carried on the chassis (10); a third sprocket (35) carried by the said first joint pin (17); a fourth sprocket (36) carried by the said third joint pin (18); two compensation arms (64, 65) pivoted centrally on the said chassis (10) each carrying at their extremities two gear sprockets (30, 31; 33, 34); a cam (70) free mounted on the said vertical shaft (28) of the handle; a joint capable of being disconnected between the said cam (70) and the said first sprocket (29); a roller tappet (71) which follows the profile of the said cam (70) and activates a slider (66), the extremity of which opposite the roller tappet (71) is connected to the ends of the said compensation arms (64, 65) by means of two levers (67, 68); an endless chain (43) passing around the said sprockets, first, second, third and fourth (29, 32, 35, 36) and the said gear sprockets (30, 31; 33, 34) carried on the said compensation arms.

11. Trolley with articulated and steerable wheels according to claim 10, characterised by the fact that the pivots of the said compensation arms (64, 65) on the said chassis (10) lie on the straight line which passes through the centres of the said third (35) and fourth (36) sprocket.

12. Trolley with articulated and steerable wheels according to claim 10, characterised by the fact that the said first, second, third and fourth sprockets (29, 32, 35, 36) pivot on the said chassis in such a way as to form a Latin cross: the said first sprocket (29) lying at the end of the longest arm of the cross; the said second sprocket (32) lying at the end of the shortest arm of the cross; and the said third and fourth sprockets 35 and 36 lying at either end of the transverse arm of the cross.

13. Trolley with articulated and steerable wheels according to claim 10, characterised by the fact that the said joint which may be disconnected between the said cam (70) and the said first sprocket (29) is controlled by a lever (72) having two positions; this lever in one position engages the connection thus rendering the sprocket (29) integral with the cam (70), and in the second position disengages the sprocket (29) from the cam (70).

* * * * *